UNITED STATES PATENT OFFICE.

LYMAN P. CONVERSE, OF CHICAGO, ILLINOIS, ASSIGNOR TO WALLACE C. CONVERSE, OF SAME PLACE.

WATERPROOFING MATERIAL.

SPECIFICATION forming part of Letters Patent No. 594,934, dated December 7, 1897.

Application filed January 3, 1895. Serial No. 533,756. (No specimens.)

*To all whom it may concern:*

Be it known that I, LYMAN P. CONVERSE, a citizen of the United States, residing at Chicago, in the county of Cook and State of Illinois, have invented a new and useful Improvement in Waterproofing Materials, of which the following is a specification.

My invention relates to an improvement in waterproof fabric; and the object of my invention is to produce a fabric which shall be waterproof and retain to the full extent its flexibility and pliability, or even have superior flexibility, and, further, to produce a fabric of this character which shall not be liable to crack under variation in temperature.

A further object of my invention is to produce such a fabric having a high polish.

My invention consists in the product and process hereinafter described, said process consisting, essentially, in boiling linseed-oil, to which may be added a binding material, such as resin or rubber, but preferably Irish moss, (carrageen,) slowly for at least five hours at a temperature of 375° to 500° Fahrenheit, but preferably 400° Fahrenheit, or thereabout, then raising the temperature for, say, from fifteen to thirty minutes to between 600° Fahrenheit and 700° Fahrenheit, preferably 600° Fahrenheit, or thereabout, cooling the oil, say, to about 150° Fahrenheit, then adding a quantity equal to that of the boiled oil, or thereabout, of animal's blood, meantime stirring the mixture, and, finally, cooking the mixture for, say, from two to four hours in a steam-jacketed kettle. The resultant material, a pasty mass, is applied in any convenient manner, as by hand, to the surfaces of textile fabrics of any sort and makes the same waterproof. If this material is to be colored, the coloring-matter, preferably in pulverulent form, such as lampblack or lampblack and oxid of zinc, is best added by grinding it with the mass to thoroughly mix it with the latter. If desired, any polishing material, such as "patent-leather polish," so called, may be applied to the coated surface of fabric, with vulcanization if the polish is of the nature to require it. The coats of waterproofing-paste may be as many as desired. I find it preferable in all cases to apply at least two coats, each very thin.

I prefer to use the linseed-oil with animal blood and binding material in about the proportion of one barrel of oil and one barrel of the blood to ten pounds of Irish moss or the equivalent of resin, rubber, or other substitute which constitutes the binding material. The quantity of thickening material or pulverulent color, which is to be selected as desired, is determined by the thickness of paste desired. I prefer to have it thin enough to apply readily by hand, as with a knife, though it may be desired to apply it with a brush, when no thickening material would be required.

It will be apparent that the present invention is an improvement upon that set forth in United States Letters Patent No. 295,113, granted to me March 11, 1884, the description of which patent may be followed, except in the particulars that Irish moss or equivalent should be added to the linseed-oil before boiling, that the addition of copal varnish or equivalent after cooling is unnecessary, and that animal's blood is an important adjunct for a filler and for lending pliability to the fabric, while the addition of oxid of zinc supplements the blood as a filler.

The blood should be in a liquid condition and is preferably raw and fresh, though it is to be had on the market in suitable condition for my purpose prepared by adding to it a small quantity of chloroform, which tends to preserve it and prevents it from coagulating. I have also used blood which has been cooked to preserve it, and the cooking thickens it to an extent requiring it to be thinned with water for my use; but I prefer to use uncooked blood. I find that the animal's blood as an ingredient for the purpose of producing my improved article of waterproof fabric mixes very readily with the linseed-oil and lends to the material the quality of a quick and good drier, rendering the use of any other drier unnecessary. Moreover, I find that the blood renders the fabric coated with the material peculiarly flexible and soft in a high degree.

What I claim as new is—

1. The fabric-waterproofing material comprising a mixture of boiled linseed-oil and cooked animal's blood, substantially as described.

2. The fabric-waterproofing material comprising a mixture of boiled linseed-oil and cooked animal's blood, and coloring material in the mixture, substantially as described.

3. The fabric-waterproofing material consisting of a paste comprising a mixture of boiled linseed-oil and cooked animal's blood and binding material, and coloring material in the mixture, substantially as described.

4. The process of producing a waterproofing material, which consists in boiling linseed-oil at a high temperature, thereupon cooling it and adding thereto and mixing therewith animal's blood, and cooking the mixture, substantially as described.

5. The process of producing a waterproofing material, which consists in boiling linseed-oil for a long period at a high temperature and raising the temperature to 600° Fahrenheit, or thereabout, thereupon cooling the oil, adding thereto and mixing therewith animal's blood, and cooking the mixture for a period of from two to four hours, or thereabout, substantially as described.

6. The process of producing a polished waterproof fabric, which consists in boiling linseed-oil and a binding material for a long period of time at a high temperature, raising the temperature to 600° Fahrenheit, or thereabout, thereupon cooling the mixture and adding thereto and mixing therewith animal's blood and cooking the mixture for a period of from two to four hours, or thereabout, adding pulverulent coloring-matter, applying the paste thus produced to a textile fabric, and then applying a patent-leather polish, substantially as described.

LYMAN P. CONVERSE.

In presence of—
M. J. FROST,
J. H. LEE.